United States Patent
Porter et al.

(10) Patent No.: US 8,097,052 B2
(45) Date of Patent: Jan. 17, 2012

(54) HOPPER FLOW SMOOTHING METHOD AND DEVICE

(75) Inventors: Michael A. Porter, Lawrence, KS (US); Sean M. McGuffie, Lawrence, KS (US)

(73) Assignee: Porter McGuffie, Inc., Lawrence, KS (US)

( * ) Notice: Subject to any disclaimer, the term of this patent is extended or adjusted under 35 U.S.C. 154(b) by 615 days.

(21) Appl. No.: 12/198,589

(22) Filed: Aug. 26, 2008

(65) Prior Publication Data

US 2009/0056545 A1 Mar. 5, 2009

Related U.S. Application Data

(60) Provisional application No. 60/966,441, filed on Aug. 28, 2007, now abandoned.

(51) Int. Cl.
*B01D 46/02* (2006.01)

(52) U.S. Cl. .......................................... 55/341.1; 55/418

(58) Field of Classification Search .................... 55/326, 55/334, 341.1, 418, 444, 525, 341.3, 341.5
See application file for complete search history.

(56) References Cited

U.S. PATENT DOCUMENTS

| | | | |
|---|---|---|---|
| 3,739,557 A | | 6/1973 | Anderson et al. |
| 3,831,350 A | | 8/1974 | Gilles et al. |
| 3,831,354 A | | 8/1974 | Bakke |
| 3,926,595 A | * | 12/1975 | Bockman ..................... 55/302 |
| 4,213,766 A | | 7/1980 | Wyatt |
| 4,227,903 A | | 10/1980 | Gustavsson et al. |
| 4,544,383 A | | 10/1985 | Haselmaker |
| 4,655,804 A | * | 4/1987 | Kercheval et al. ............ 55/324 |
| 4,883,509 A | * | 11/1989 | Giusti et al. .................. 55/326 |
| 4,883,510 A | * | 11/1989 | Giusti et al. .................. 55/326 |
| 5,022,897 A | * | 6/1991 | Balcar et al. .................. 95/279 |
| 5,030,261 A | * | 7/1991 | Giusti et al. .................. 55/326 |
| 6,073,905 A | * | 6/2000 | Wilson ........................ 251/61 |
| 2009/0020011 A1 | * | 1/2009 | Gregg ........................... 95/268 |

* cited by examiner

*Primary Examiner* — Duane Smith
*Assistant Examiner* — Minh-Chau Pham
(74) *Attorney, Agent, or Firm* — Hovey Williams LLP

(57) ABSTRACT

A filtration system for a particulate-laden stream of gas utilizes a group of fabric bags within the upper chamber of a housing as the means by which particulate matter is filtered out of the gas. The gas inlet into a lower chamber of the housing is provided with an inlet guide that directs the incoming gas against the lower side of a porous diffuser located below the group of bags and spanning at least most of the separation zone defined by the bags. Passages through the diffuser are configured to present an array of nozzles so that the gas is subjected to a pressure drop across the diffuser before flowing to the bags. The nozzle effect causes the particulate-laden gas to spread out evenly on the lower, upstream side of the diffuser and pass through the diffuser at substantially equal velocity at all passages, thereby smoothing the flow and distributing it evenly to all bags.

18 Claims, 7 Drawing Sheets

HOPPER FLOW SMOOTHING METHOD AND DEVICE

RELATED APPLICATION

This application is related to and claims the priority benefit of prior U.S. Provisional Application No. 60/966,441, filed Aug. 28, 2007, said Provisional Application being hereby incorporated by reference into the present specification.

TECHNICAL FIELD

The present invention relates to filtration systems for particulate-laden gas streams and, more particularly, to an apparatus and method for more evenly distributing particulate-laden gas to filter bags in such a system to improve the efficiency and operating life of the system.

BACKGROUND AND SUMMARY

An even flow of the gas phase fluid in hoppers is often desirable for the efficient operation of equipment such as bag house filter systems. Conventionally, controlling the flow is based primarily on the use of scale models and experience. As a result, in conventional systems the flow is very non-uniform.

Typically, the hoppers are fed from a central header. The flow enters the hopper from one side and is then directed upwardly. Guide vanes are often installed in the hopper to direct the flow. Such guide vanes are typically oriented at right angles to the incoming flow direction. In many cases, the guide vanes are ineffective in promoting an even flow. In the case of bag house filter systems, this uneven flow distribution results in regions of high upward or horizontal velocity flow impinging on the bags. This high velocity flow causes high wear and premature failure of the bags. The uneven flow distribution results in uneven loading on the filter bags and premature clogging of the bags.

Using Computational Fluid Dynamics, a mathematical modeling procedure, fluid flow in the hopper system can be computed. The mathematical procedure used in the CFD process can consist of Finite Element or Finite Volume methods, as well as other methods known to fluids analysts. The use of CFD allows the analyst to produce numerical and visual representations of the fluid flow. Using this method, apparatus in accordance with the present invention can be custom-tuned to the hopper system and operating conditions. This tuning entails shaping an inlet guide to direct flow to the optimal spot on a diffuser and adjusting the placement, open area and angle of the diffuser. Pictorial representations of the fluid flow field, as well as numerical analysis of the flow field velocities, are used to evaluate the suitability of the flow patterns.

In accordance with the present invention, particulate-laden gas is directed into the hopper from one side thereof through an inlet guide. The inlet guide directs the flow against the bottom, upstream side of a porous diffuser that spans the hopper below a multiplicity of filter bags disposed at a higher position in the system. Passages through the diffuser are dimensioned and configured to serve as an array of nozzles so as to cause the gas to experience a pressure-drop as it passes through the diffuser, thereby forcing gas from the inlet guide to be evenly distributed across the upstream side of the diffuser. The gas thus passes to the bags in a smoother, more evenly distributed manner than in prior art systems, improving efficiency and reducing premature equipment wear.

DETAILED DESCRIPTION

Figure 1:
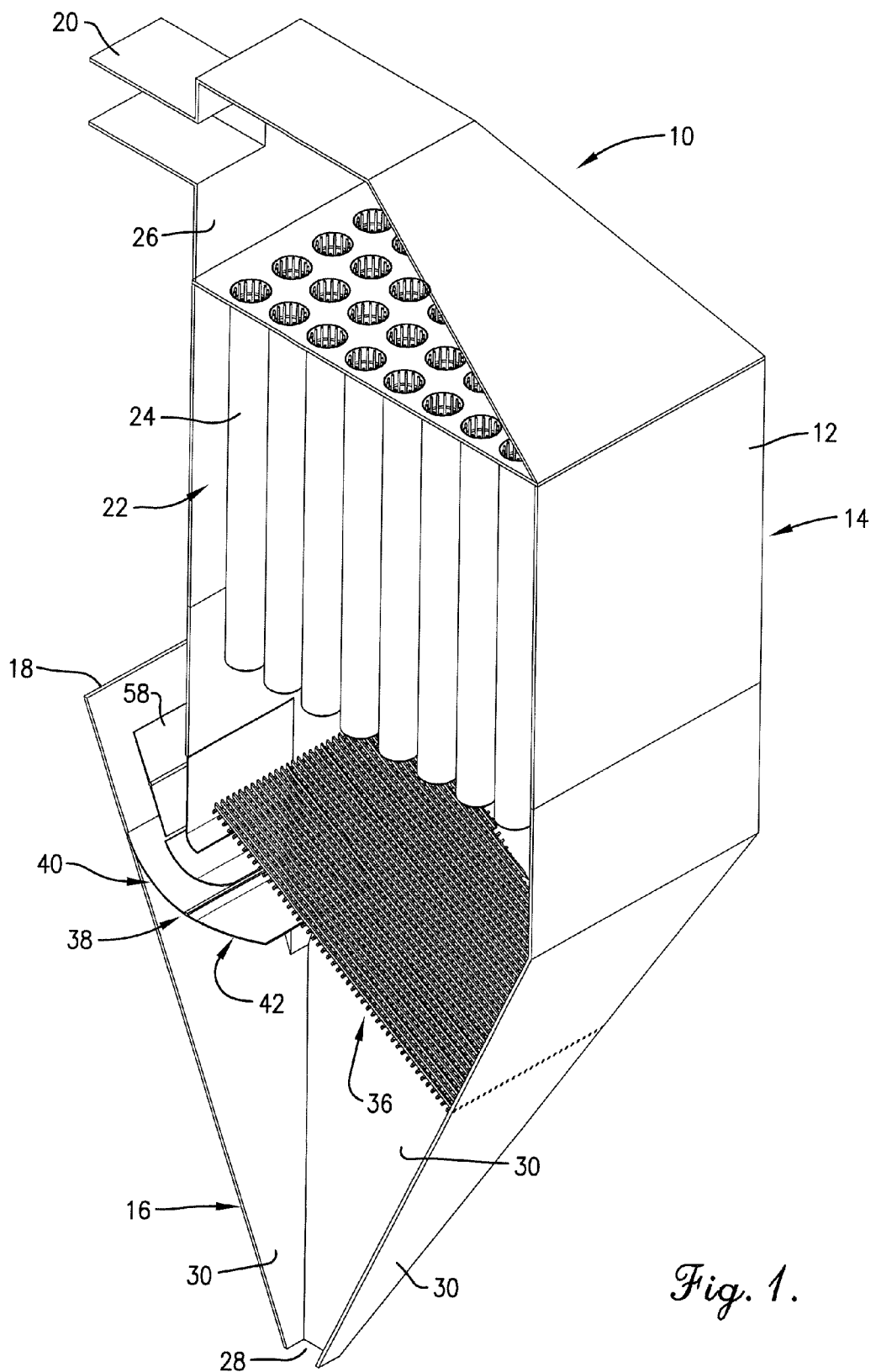
FIG. 1 is an isometric view of a filtration apparatus constructed in accordance with the principles of the present invention, the near sidewall of the apparatus being removed to reveal internal details of construction.
Figure 2:
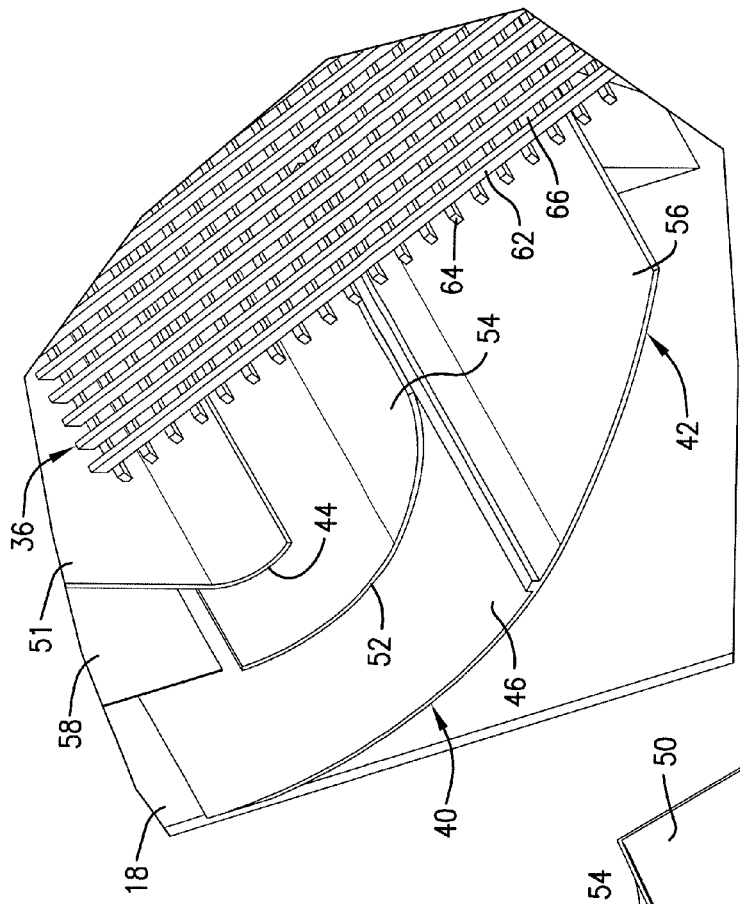
FIG. 2 is an enlarged, fragmentary isometric view of the apparatus illustrating details of construction of the inlet guide and one embodiment of the diffuser of the apparatus.
Figure 2A:
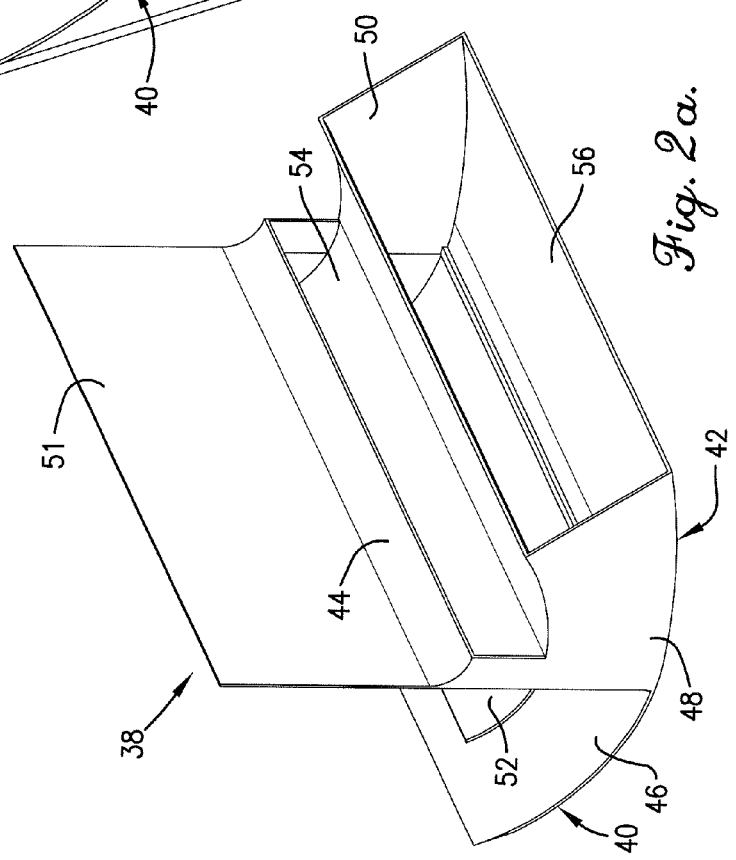
FIG. 2a is an isometric view of the inlet guide removed from the apparatus.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

The filtration apparatus 10 broadly includes a housing 12 configured and arranged to present a bag house 14 above a hopper 16. Housing 12 has an inlet 18 through which particulate-laden gas may enter apparatus 10 and an outlet 20 through which the filtered gas may leave apparatus 10. An upper chamber 22 of housing 12 contains a multiplicity of elongated, vertically oriented, horizontally spaced fabric filter bags 24 of generally cylindrical configuration in accordance with well-known principles. Bags 24 are engaged by the particulate-laden gas as it moves upwardly through housing 12 from inlet 18 to outlet 20 to remove and collect particulate matter from the gas stream. In order to exit from housing 12, the stream must pass laterally into the center of bags 24 and then flow axially upwardly into a header 26 above bags 24 in communication with outlet 20. Collected particulate matter on bags 24 may be removed from time-to-time using a variety of means including, for example, vibratory devices and positive air blasts, such that the particulate materials gravitate through hopper 16 and leave through a discharge outlet 28. Sloping sides 30 on hopper 16 converge toward discharge outlet 28 to direct the particulate materials in the appropriate manner.

Figure 3:
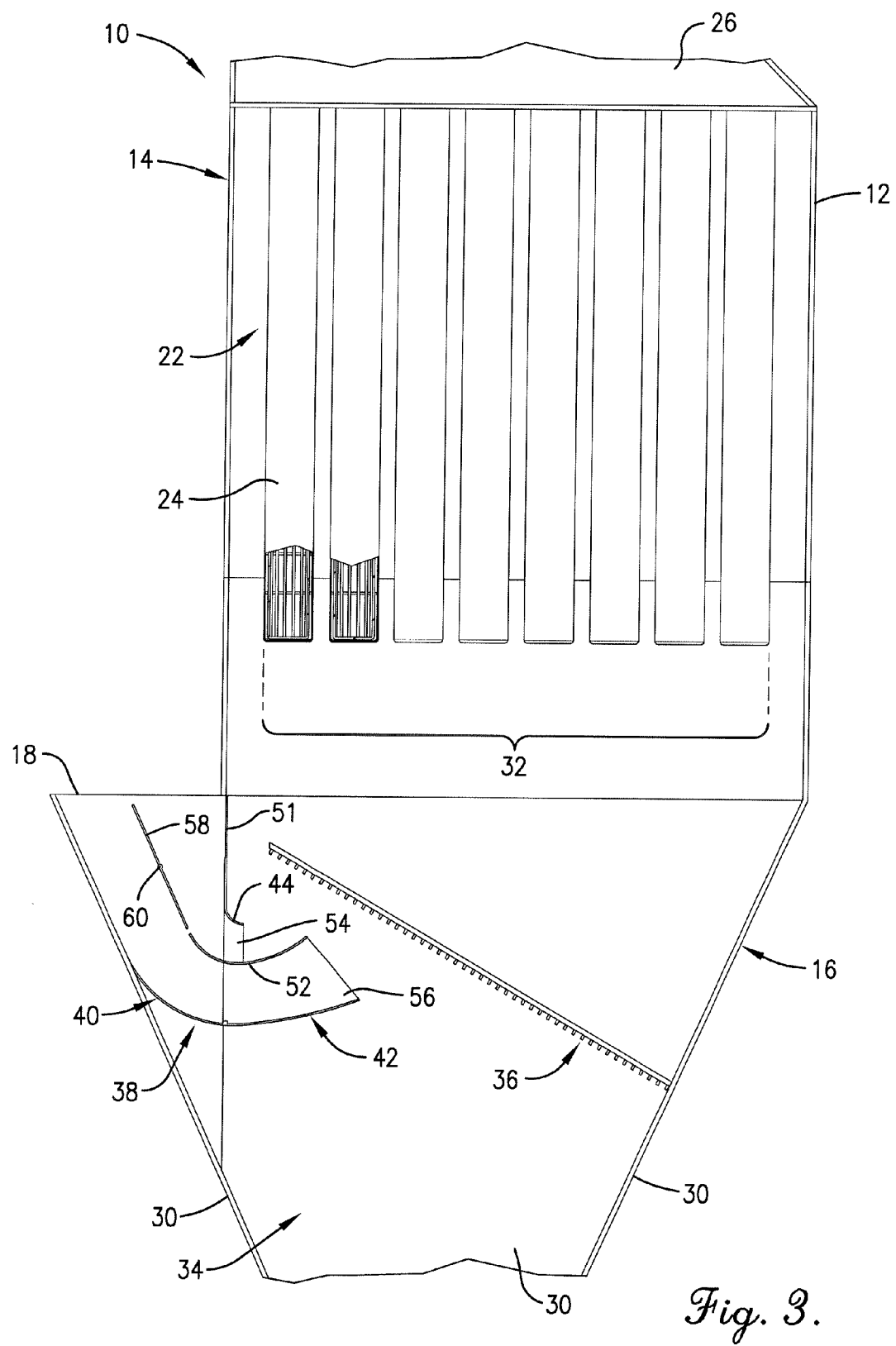
FIG. 3 is a fragmentary side elevational view of the apparatus with the near sidewall removed.

The space occupied by the group of bags 24 can be described as a separation zone 32 (FIG. 3.) whose lateral boundaries are defined by the perimeter of the group. Hopper 16 defines a lower chamber 34 below the bags 24 that communicates with inlet 18. Within lower chamber 34 is a porous diffuser element 36 that spans chamber 34 and is supported by the sides 30 of hopper 16. In a preferred embodiment, diffuser 36 extends across at least most of zone 32 so as to be in vertical registration with bags 24.

Figure 5:
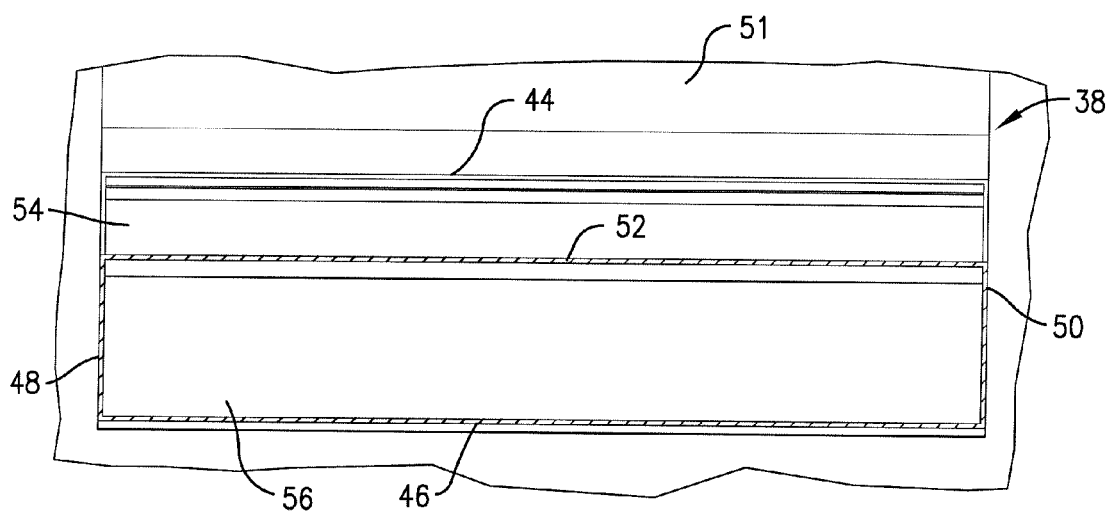
FIG. 5 is a vertical cross-sectional view through the inlet guide taken substantially along line 5-5 of FIG. 4.
Figure 6:
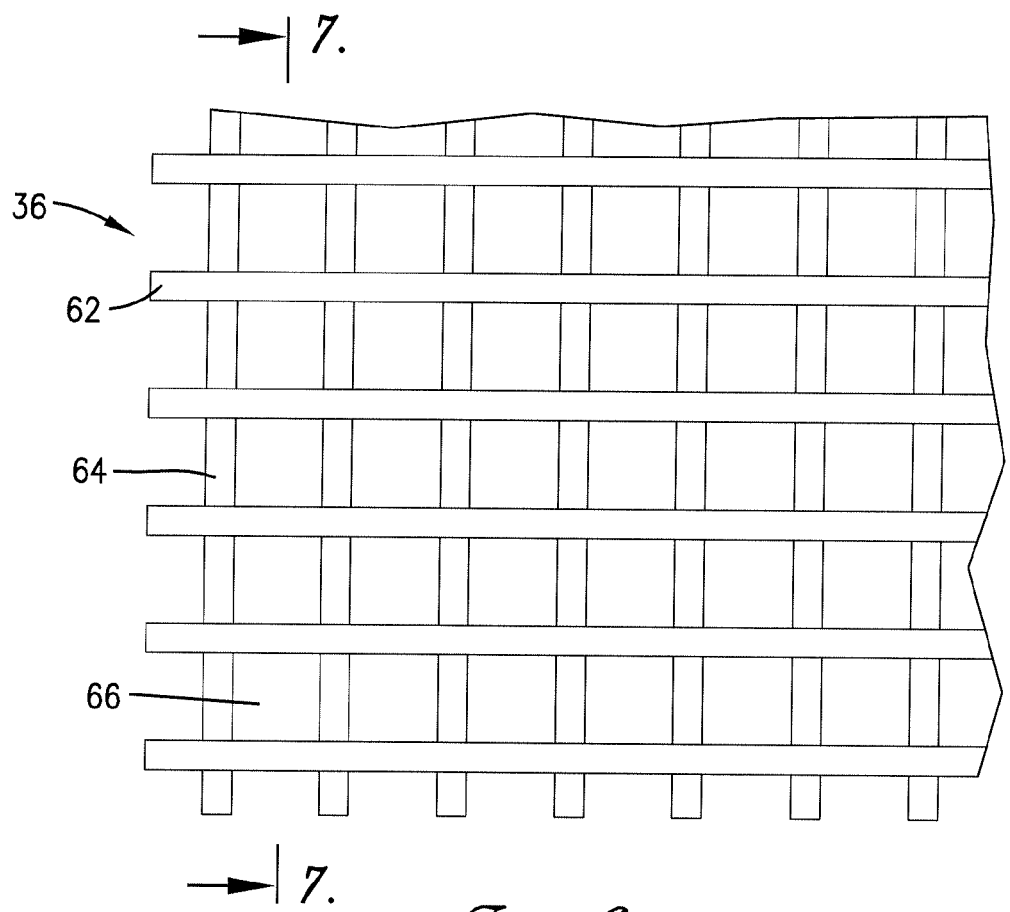
FIG. 6 is a fragmentary, top plan view of the first embodiment of diffuser.

Associated with inlet 18 is an inlet guide 38 that introduces incoming particulate-laden gas into lower chamber 34 and directs it against the bottom, upstream side of diffuser 36. Inlet guide 38 projects laterally inwardly into lower chamber 34 and comprises a tubular, generally horn-shaped body that receives the generally downwardly flowing particulate-laden gas stream in inlet 18 and gently turns it horizontally and preferable slightly upwardly toward the center of diffuser 36. To accomplish this greater-than-ninety degree turning, inlet guide 38 has a generally downwardly extending, curvilinear inlet portion 40 and a slightly upturned, curvilinear outlet portion 42 integral with and extending longitudinally from inlet portion 40. In one preferred form, inlet guide 38 has a short, curvilinear, longitudinally extending upper wall 44, an opposed, curvilinear, longitudinally extending lower wall 46, and a pair of opposite, planar, upright sidewalls 48, 50. Thus, as illustrated in FIG. 5, inlet guide 38 is generally rectangular in transverse cross-section. A rectangular, upright plate 51, having the same width as upper wall 44, projects upwardly from the inlet end of wall 44.

Figure 4:
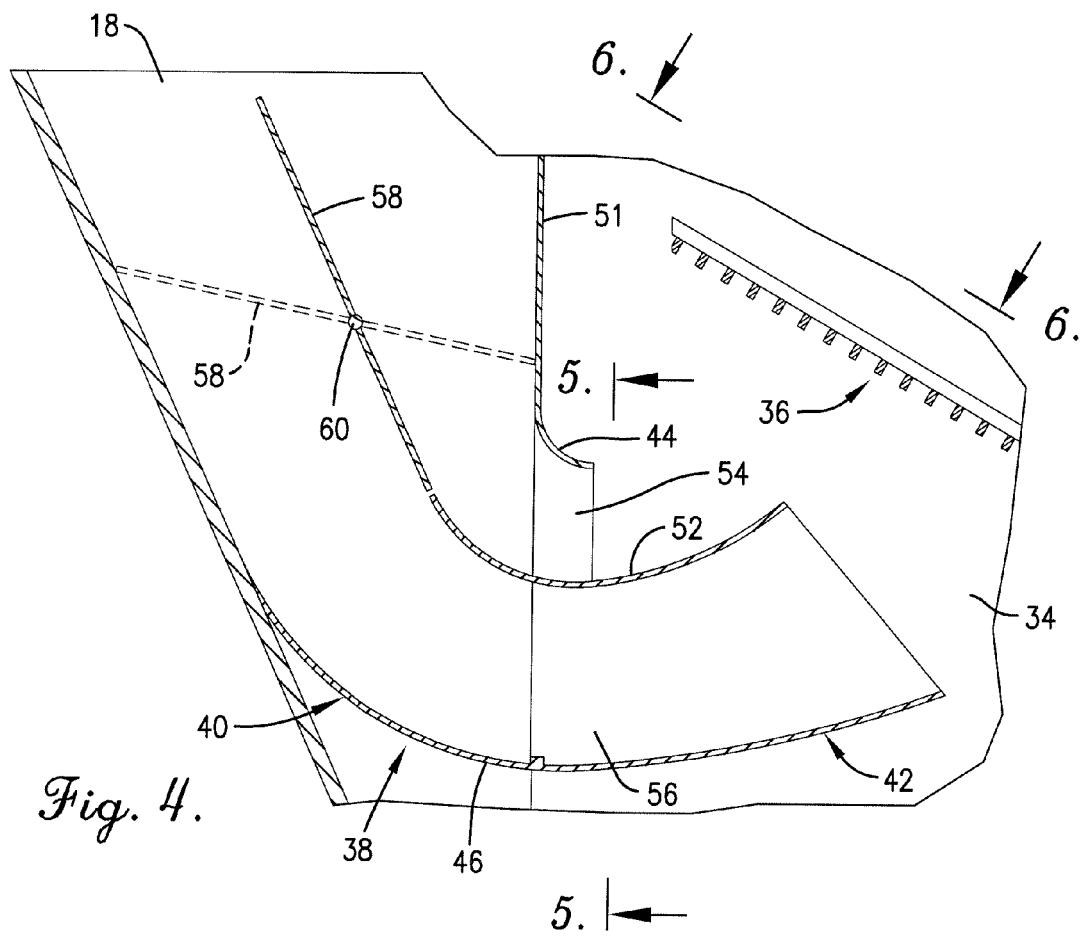
FIG. 4 is an enlarged, fragmentary vertical cross-sectional view of the apparatus illustrating in phantom lines the closed position of the butterfly valve located immediately upstream from the inlet guide of the apparatus.

Inlet guide 38 also has a central, curvilinear partition or turning vane 52 that divides its interior into a pair of superimposed flow guide channels 54, 56. A flat butterfly valve 58 at the inlet end of channels 54, 56 is pivotable by means not shown about a transverse axis 60 located in aligned registration with the inlet end of vane 52 such that valve 58 can be selectively disposed in either an open position in which it is aligned with vane 52 to open channels 54, 56 or a closed position spanning across channels 54, 56 (phantom lines in FIG. 4) to effectively close channels 54, 56. The outlet end of channel 54 is set back with respect to the outlet end of channel 56 such that vane 52 extends into lower chamber 34 beyond top wall 44 and functions as a lower guide surface for gas from channel 54. The outlet end of lower channel 56 is flared slightly in a vertical direction.

It is to be noted that the specific dimensions, contours and relationships of the different parts of inlet guide 38, as preferably determined by CFD techniques, may vary somewhat depending upon numerous factors, including, for example, the nature and configuration of bag house 14, hopper 16, and inlet 18. The inlet guide illustrated in the drawings is but one example of a number of configurations that the inlet guide might take in accordance with the principles of the present invention. In all instances, however, the inlet guide projects laterally inwardly into lower chamber 34 and performs the function of introducing the particulate-laden gas into lower chamber 34 while turning the flow and directing it against the bottom, upstream side of diffuser 36.

Diffuser 36 is preferably generally planar in nature and is rectangular in overall configuration. It is oriented within lower chamber 34 at an angle of between 0° and 45° to the nominal flow direction (horizontal), with an angle of approximately 20° being most common. It functions as an array of nozzles so as to create a pressure drop from its bottom, upstream side to its upper, downstream side. This causes the gas flow on the bottom, upstream side of diffuser 36 to spread out over the entirety of diffuser 36 and to pass through all of the passages at substantially the same velocity. The particulate-laden gas flow thus becomes smoother and more uniform as it exits from diffuser 36 and passes upwardly into and through bags 24.

The nozzle effect of diffuser 36 is produced by a multiplicity of passages through diffuser 36, each of which has a length in the flow direction that is at least as great as the nominal transverse dimension of the passage. In a most preferred embodiment, the length of each passage is approximately the same as the nominal transverse dimension of the passage. These passages may take a variety of different shapes, and the diffuser itself may be constructed in a number of different ways, but in all instances the goal is to have a nozzle effect such that a pressure drop is achieved across the diffuser. Typically, the nominal transverse dimension of each passage is on the order of 1.5 inches, while the percentage of open area of the diffuser ranges from 30% to 70%, with 50% being the most common.

Figure 7:
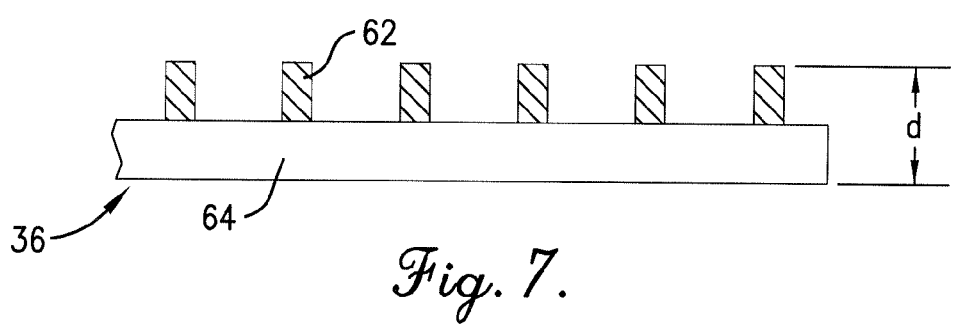
FIG. 7 is a fragmentary cross-sectional view of the first embodiment of diffuser taken substantially along line 7-7 of FIG. 6.

In the embodiment of FIGS. 1-7, diffuser 36 comprises a grid formed by a pair of superimposed layers of bars 62, 64 disposed at right angles to one another. In the illustrated embodiment, all adjacent bars 62, 64 are equally spaced from one another such that passages 66 formed by the intersecting bars are square in transverse cross-section. As illustrated in FIG. 7, the distance "d" from the top surface of bars 62 to the bottom surface of bars 64 comprises the length of each passage 66 in the flow direction, which length is at least as great as the nominal transverse dimension of each passage.

As used herein, the term "nominal" transverse dimension means the "RMS" value (root mean square value) of the passage in the transverse direction. In the case of a rhombus, examples of which are parallelograms with other than 90° included angles, rectangles, and squares, the RMS value comprises the square root of the mean of the squares of the diagonals across the passage from corner to corner. In the case of an ellipse, which is herein intended to mean both true ellipses and circles, the RMS value comprises the square root of the mean of the squares of the major and minor axes. Of course, in the case of a circle, this will correspond to the diameter of the circle.

Figure 8:
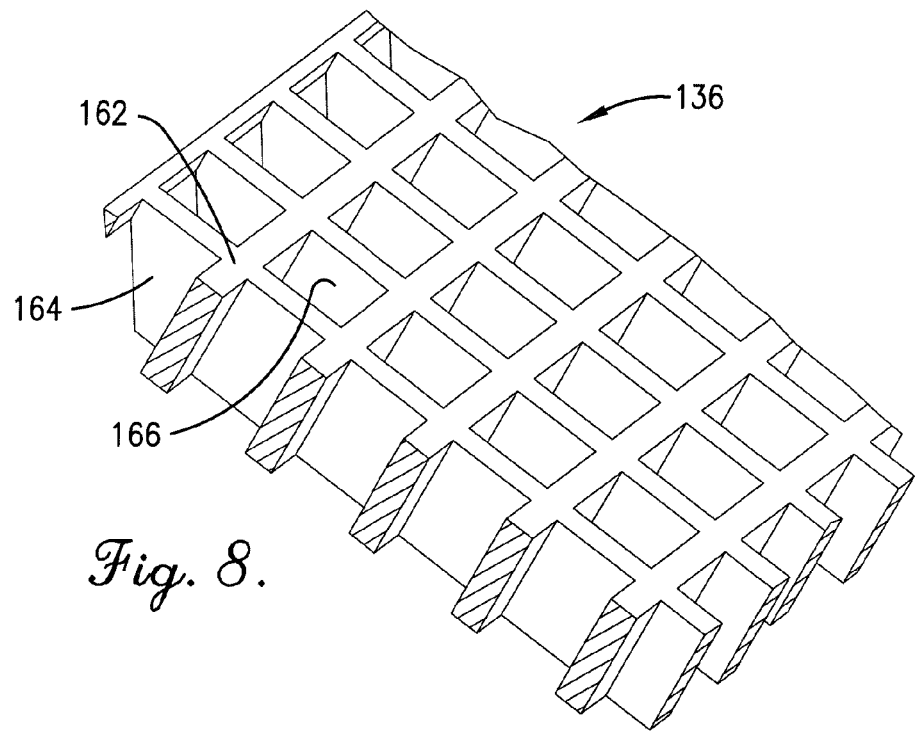
FIG. 8 is a fragmentary isometric view of a second embodiment of the diffuser.
Figure 9:
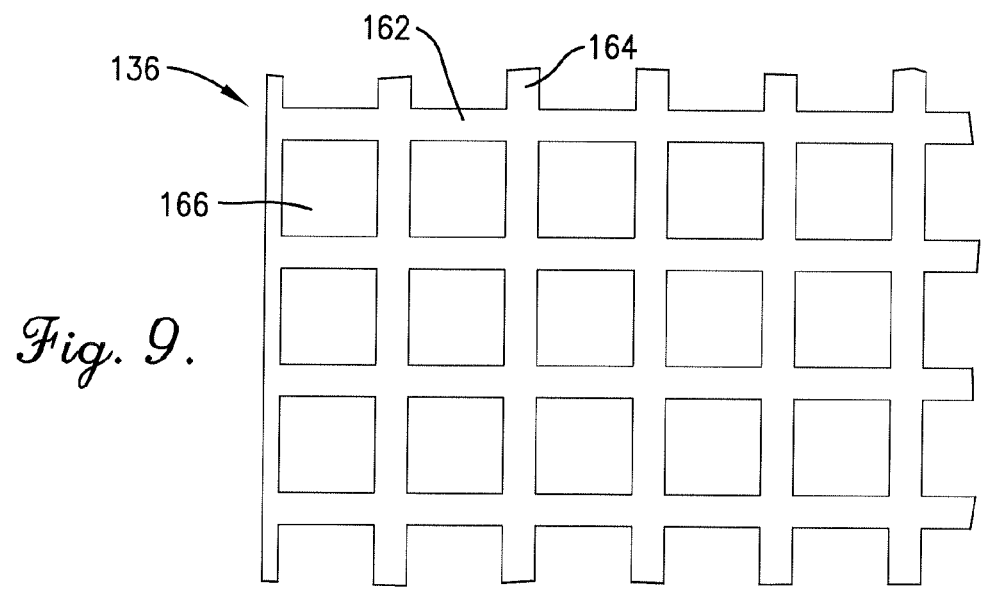
FIG. 9 is a fragmentary top plan view of the second embodiment of diffuser.
Figure 10:
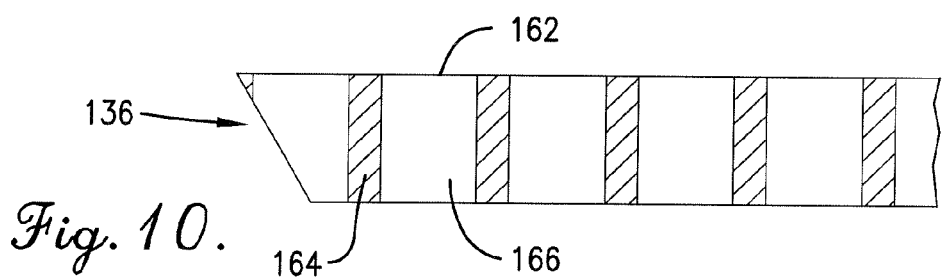
FIG. 10 is a fragmentary, vertical cross-sectional view of the second embodiment of diffuser.

FIGS. 8-10 illustrate a second embodiment of diffuser, designated 136. In this embodiment diffuser 136 is in the nature of a flat plate having passages 166 through the plate that are square in transverse cross-section. The square passages 166 through the plate cause the presentation of intersecting, laterally spaced apart rib members 162 and 164 that are all in the same plane (not superimposed as in the case of bars 62, 64 of the first embodiment). Rib members 162, 164 are all of the same width, as well as the same thickness (measured in the flow direction), and they intersect one another at right angles. The length of each passage 166 (the thickness of the rib members 162) is at least as great as the nominal transverse dimension of the passage, and is preferably approximately the same as the nominal transverse dimension of the passage. Diffuser 136 may conveniently be manufactured using a casting process.

Figure 11:
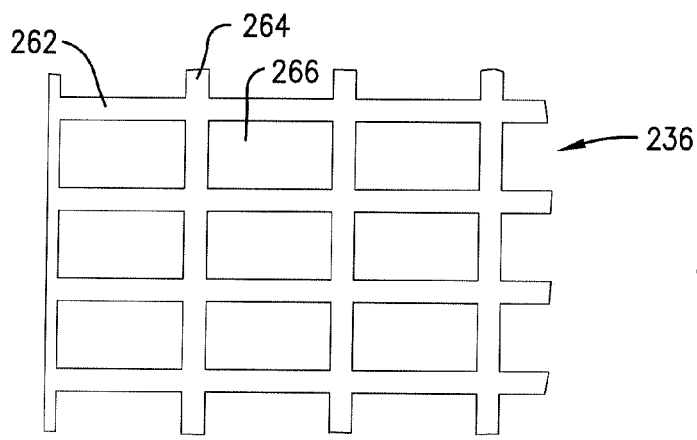
FIG. 11 is a fragmentary, top plan view of a third embodiment of the diffuser.

FIG. 11 illustrates another embodiment of the diffuser identified by the numeral 236. Diffuser 236 has passages 266 that are rectangular but not square in transverse cross-section. Passages 266 cause the presentation of laterally spaced rib members 262 and 264 that intersect at right angles and are all disposed in the same plane.

Figure 12:
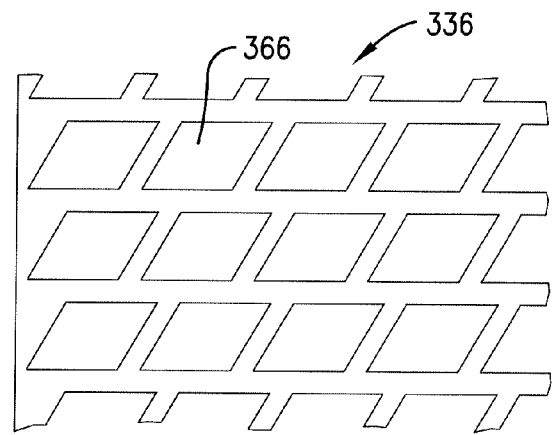
FIG. 12 is a fragmentary, top plan view of a fourth embodiment of the diffuser.

FIG. 12 illustrates another embodiment of the diffuser identified by the numeral 336. Diffuser 336 has passages 366 that appear as parallelograms in transverse cross-section with included angles that are not right angles.

Figure 13:
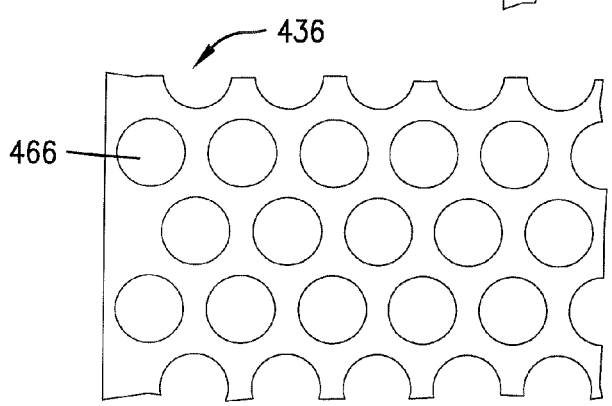
FIG. 13 is a fragmentary, top plan view of a fifth embodiment of the diffuser.

FIG. 13 illustrates another embodiment of the diffuser identified by the numeral 436. In this embodiment diffuser 436 has passages 466 that are circular in transverse cross-section.

Figure 14:
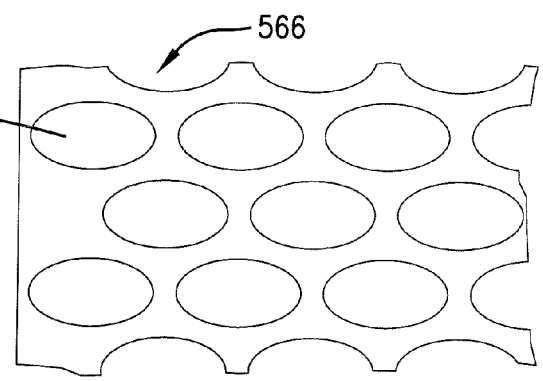
FIG. 14 is a fragmentary, top plan view of a sixth embodiment of the diffuser.

FIG. 14 illustrates another embodiment of the diffuser identified by the numeral 536. Diffuser 536 has passages 566 that appear as true ellipses in transverse cross-section.

Although not illustrated in the drawings, it will be appreciated that many other cross-sectional shapes are available for the passages through the diffuser without departing from the principles of the present invention. For example, the passages could also be polygonal with other than four sides, or be of irregular cross-sectional shape. The key is producing a nozzle effect with the passages, which is a function of the length of the passage and its nominal size, not usually the specific cross-sectional shape of the passage.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. Apparatus for use in separating particulate matter from a particulate-laden gas stream, said apparatus comprising:
   a housing defining an upper chamber containing a multiplicity of vertically oriented, elongated filter bags arranged in spaced parallel relation to one another,
   said multiplicity of bags defining a particle separation zone within said upper chamber having predetermined lateral boundaries,
   said housing further defining a lower chamber located below the multiplicity of bags;
   a porous diffuser below said bags within said lower chamber and spanning at least most of said particle separation zone; and
   an inlet guide projecting laterally into said lower chamber from one side of the housing in disposition for directing particulate-laden gas against a bottom, upstream side of the diffuser,
   said diffuser having a multiplicity of passages therethrough disposed to create a pressure drop in the particulate-laden gas as it travels from the upstream side to the downstream side of the diffuser whereby to promote even distribution of the particulate-laden gas across the particle separation zone,
   each passage being bounded on all sides by structure other than portions of the housing when the diffuser is viewed in plan.

2. Apparatus as claimed in claim 1,
   said diffuser being positioned in such a manner that the bottom, upstream side of the diffuser generally faces said inlet guide.

3. Apparatus as claimed in claim 1,
   each passage of said multiplicity of passages in the diffuser having a length that is at least as great as the nominal width of the passage.

4. Apparatus as claimed in claim 3,
   said length being approximately the same as the nominal transverse dimension of the passage.

5. Apparatus as claimed in claim 1,
   each passage of said multiplicity of passages having a length that is approximately the same as the nominal transverse dimension of the passage.

6. Apparatus as claimed in claim 1,
   each passage of said multiplicity of passages being at least generally rectangular in transverse cross-section.

7. Apparatus as claimed in claim 6,
   each passage of said multiplicity of passages being square in transverse cross-section.

8. Apparatus as claimed in claim 1,
   each passage of said multiplicity of passages being circular in transverse cross-section.

9. Apparatus as claimed in claim 1,
   said diffuser comprising a grid having two levels of laterally spaced, parallel bars, the bars of one level being disposed at right angles to the bars of the other level.

10. Apparatus as claimed in claim 1,
    said diffuser comprising a plate having said multiplicity of passages disposed therein.

11. Apparatus as claimed in claim 1,
    said inlet guide having a generally downwardly extending, curved inlet portion and a generally horizontally extending, curved outlet portion that is a continuation of said inlet portion.

12. Apparatus as claimed in claim 11,
    said outlet portion being directed generally toward the center of said diffuser.

13. Apparatus as claimed in claim 11,
    said outlet portion being directed slightly upwardly toward the diffuser.

14. Apparatus as claimed in claim 11,
    said inlet guide having a longitudinally extending vane dividing the guide into a pair of adjacent channels,
    said guide further having a valve flap at an upstream end of the inlet portion selectively positionable in either a closed position spanning across said channels or an open position extending generally longitudinally aligned with said vane.

15. A method of separating particulate matter from a particulate-laden gas comprising:
    introducing a particulate-laden gas into a chamber below a multiplicity of vertically oriented, elongated filter bags arranged in spaced parallel relation to one another,
    said multiplicity of bags defining a particle separation zone having predetermined lateral boundaries;
    before the particulate-laden gas is exposed to the multiplicity of filter bags, directing the particulate-laden gas against a bottom, upstream side of a porous diffuser that is located below the multiplicity of bags and spans across at least most of the separation zone; and
    passing the particulate-laden gas upwardly through the diffuser to the bags for filtration by the bags,
    said diffuser having a multiplicity of passages configured to cause a pressure drop in the particulate-laden gas as it passes through the diffuser,
    each passage being bounded on all sides by structure other than portions of the housing when the diffuser is viewed in plan.

16. A method as claimed in claim 15,
    said diffuser being placed with said bottom, upstream side thereof facing the particulate-laden gas that is directed thereto.

17. A method as claimed in claim 15,
    each passage of said multiplicity of passages in the diffuser having a length that is at least as great as the nominal transverse dimension of the passage.

18. A method as claimed in claim 17,
    said length being approximately the same as the nominal transverse dimension of the passage.

* * * * *